Nov. 14, 1961   P. ZUK   3,008,369

OPTICAL THICKNESS GAUGE

Filed Aug. 22, 1956

INVENTOR
P. ZUK
BY
Walter M. Hill
ATTORNEY

United States Patent Office 3,008,369
Patented Nov. 14, 1961

3,008,369
OPTICAL THICKNESS GAUGE
Paul Zuk, Allentown, Pa., assignor to Bell Telephone Laboratories, Incorporated, New York, N.Y., a corporation of New York
Filed Aug. 22, 1956, Ser. No. 605,581
6 Claims. (Cl. 88—14)

This invention relates to the art of physical measurements and more particularly to an apparatus for determining the thickness of materials by optical means.

It is well known that some materials will transmit radiant energy of certain wavelengths more readily than others, that is to say their ability to transmit such energy is selective with respect to wavelength. It is also well known that, for a given material, the intensiy of the energy emerging therefrom is a logarithmic function of its thickness. Errors are frequently encountered when attempts are made to measure the thickness of a material on the basis of the amount of energy transmitted. The most important cause of these errors is the presence of the extraneous energy causing what is frequently termed "noise." It is desirable that these effects be reduced as much as possible or eliminated altogether.

It is the object of this invention to provide an optical means for determining the thickness of radiant energy transmissive materials which is substantially free of such noise effects and which preferably utilizes a self-contained source of radiant energy.

The foregoing object is achieved by this invention which provides two sources of radiant energy so positioned as to impress beams of energy, respectively, on two detector cells. A chopping means is provided for periodically interrupting the energy from said two sources so that the energy received by the two cells is of the same frequency and of fixed relative phase. The outputs from the two cells are combined in a combining circuit of the wattmeter-type or, in the alternative, in a phase detector to produce an output observed by a meter. The test specimen is placed in the path of one beam to reduce the transmitted energy by an amount depending upon the specimen thickness. Since the other beam produces a substantially constant output, and since the phase angle is maintained constant, an indicator associated with the combining circuit will respond as a function of the specimen thickness. This response is substantially independent of signals different from the chopper frequency and is, therefore, unresponsive to noise effects.

Figure 1:
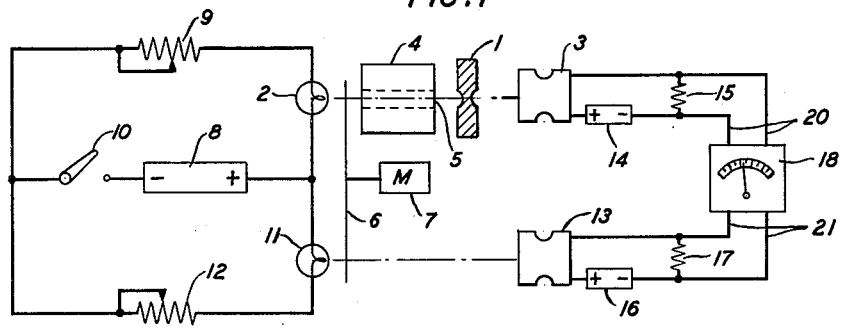
Figure 2:
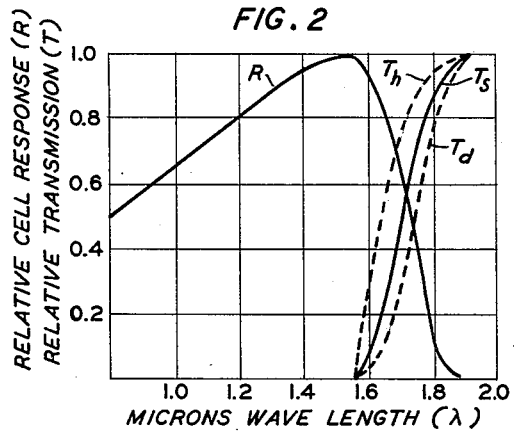
Figure 3:
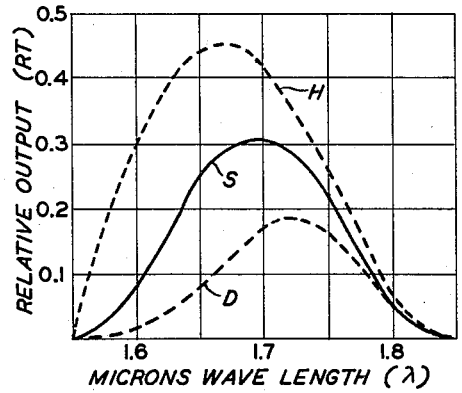
Figure 4:
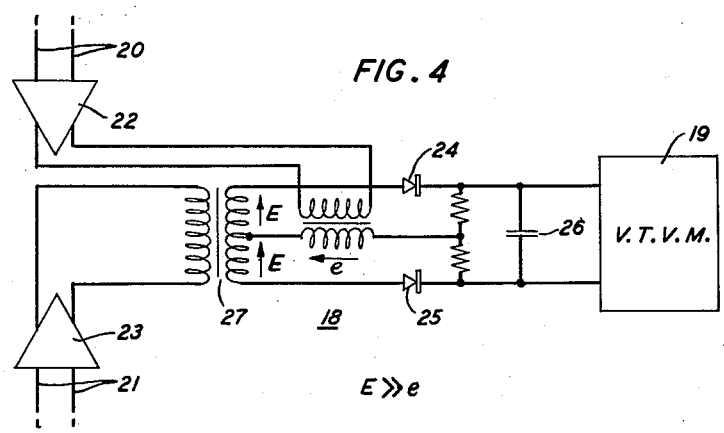

The invention may be better understood by referring to the accompanying drawings in which:

FIG. 1 is a schematic diagram showing the essential elements of a preferred embodiment of the invention;

FIG. 2 discloses the characteristic of one type of radiant energy detection cell and the relative transmission characteristic of one type of specimen which may be measured;

FIG. 3 shows the relative output of the combination of cell response and the relative transmission of the specimen showing the effect of variation in thickness; and FIG. 4 discloses one type on phase detector circuit which may be used in the combination shown in FIG. 1.

Referring now to FIG. 1, a specimen 1, the thickness of which is to be measured, is shown positioned between a source of radiant energy 2 and a suitable energy detector 3. By way of a specific example, it may be assumed that source 2 is an ordinary incandescent lamp operated below its rated voltage so as to generate predominately infra-red energy. The cell 3 may be a germanium phototransistor known as the Western Electric 1N85 phototransistor. The specimen 1 is a germanium wafer. The thickness of the reduced portion of the cross-section of this wafer may vary, for example, from 1 to 10 mils. The energy from source 2 is preferably collimated by a collimator 4 consisting simply of an opaque block having an elongated aperture 5 through which the energy may pass. The energy received by the wafer 1 is, therefore, in the form of a substantially plane wave confined to the area of the section to be measured. In order that the energy may appear as a series of pulses, a chopper wheel 6, driven by a motor 7, is arranged to intermittently interrupt this energy before it is received by the wafer.

Power for energizing lamp 2 is provided from a direct-current source 8 through an obvious path including a rheostat 9 and switch 10. Rheostat 9 is used for controlling the intensity of the infra-red energy from lamp 2.

A similar lamp 11 and rheostat 12 is also connected to source 8 and the energy emerging therefrom is similarly interrupted by chopper wheel 6 before reaching an auxiliary detector 13. It is to be understood that this entire optical system is preferably but not necessarily enclosed. A suitable septum preferably separates the two energy paths so that energy from one lamp is not received by the detector associated with the other lamp. This structure is conventional and has been omitted for the sake of simplicity.

Phototransistors 3 and 13 are supplied with a bias potential from their respective direct-current sources 14 and 16 through their associated resistors 15 and 17. The output from detector 3 is connected by way of conductors 20 to a pair of input terminals of a combining circuit 18. The output from the other cell 13 is similarly connected to circuit 18 by way of conductors 21. It will be understood that if the circuit 18 is of the conventional wattmeter-type, one of the pairs of input terminals, for example, those connected to conductors 20, may correspond with the "voltage" terminals while conductors 21 are connected to the "current" terminals. The wattmeter will respond proportional to the product of the two input voltages and their relative phase angle. The relative phase angle may be adjusted by angularly positioning source 11 with respect to source 2. Since this angle is kept constant after it is once adjusted and since the energy from source 11 remains substantially constant, the input voltage at terminals 21 of the wattmeter will remain fixed. The indication on the wattmeter scale thus varies with the input voltage received from conductors 20. Since this voltage is a function of the thickness of wafer 1, it will be evident that the wattmeter scale can be calibrated to indicate this thickness.

Two sets of curves are shown in FIG. 2. The curve labeled R is a typical relative cell response characteristic for a germanium phototransistor which may be used as detectors 3 and 13. It will be noted that, in the range of wavelengths from about 1.55 microns to about 1.85 microns, the cell response lowers from its maximum sensitivity to substantially zero. In this same figure is also plotted the transmission characteristic of the germanium wafer 1. It will be noted that for a given standard thickness $T_s$ the relative transmission of the specimen material increases from substantially zero at 1.55 microns to a value of unity in the neighborhood of 1.85 microns. The two dotted curves $T_h$ and $T_d$ show the transmission characteristics for specimens of half the standard thickness and double the standard thickness, respectively. For example, the curve labeled $T_h$ represents the increase in transmission through a specimen thickness of half that of the standard.

FIG. 3 shows only three of a family of curves representing the relative output from the detector 3. Each curve of the family is produced by the combination of the characteristic of the relative cell response and the relative transmission of a specimen of given thickness as shown in FIG. 2. This relative output for any one wavelength and specimen thickness is the product of the relative response and relative transmission at that same wavelength. The curve labeled S is a plot of the product of the values taken from curve R and curve $T_s$ in FIG. 2. Similarly, the curve H is a plot of the values obtained from curves R and $T_h$ and the curve D is a plot of the product of values obtained from curves R and $T_d$. The resulting characteristics shown in FIG. 3 indicate that for wavelengths below about 1.55 microns there will be no cell response. This is due to the cut-off effect produced by the specimen. For wavelengths in excess of about 1.85 microns there will again be no cell response. In this case it is due to the cut-off characteristic of the cell. Between these two wavelengths there is a maximum and the total cell response is proportional to the area under the curve. It will thus be evident that, so far as wavelengths coming from the source 2 are concerned, the total cell response is insensitive to wavelengths above and below the two limits shown in FIG. 3 and that the marked differences in areas show that this total response is very sensitive to the thickness of the specimen. This phenomenon is referred to as the principle of band edge absorption.

While it is preferred to utilize the principle of band edge absorption in the use of the apparatus of this invention, it is possible to measure other materials whose relative transmission characteristic intersects curve R of FIG. 2 to the left of its maximum value. The positive slope of the relative transmission characteristic of this other material may have a shape similar to that shown for germanium. For example, it is known that silicon has the positive slope of its characteristic intersecting the cell response curve R at about 1.1 microns. For such materials, however, it is necessary to add an additional filter to cut off all response beyond the point where their relative transmission characteristics reach approximately unity. For silicon, this is at a point approximating 1.25 microns.

The circuit shown in FIG. 4 is of a conventional type phase detector substantially identical with the one shown in FIG. 1 of United States Patent 1,919,284, granted July 25, 1933, to H. Walter. This phase detector replaces the wattmeter 18 of FIG. 1. The input from cell 3 is received by way of conductors 20 by a tuned amplifier 22, the output of which is impressed as a signal voltage $e$ upon the common leg of the phase detector. The output from cell 13 is correspondingly received by way of conductors 21, amplified by tuned amplifier 23 and applied to the other pair of input terminals of the phase detector. This results in a reference voltage E appearing across each half of the secondary of transformer 27. A pair of rectifiers 24, 25 act as modulators and when the reference voltage E is large compared with voltage $e$ and the two input voltages are of the same frequency, the output voltage appearing across condenser 26 is closely proportional in magnitude and phase to the product of the signal voltage $e$ and the cosine of the phase angle. As previously mentioned, the voltage at terminals 21 is maintained at constant magnitude and fixed phase with respect to the voltage received by conductors 20 and consequently the indication of meter 19 will be proportional to the voltage received by conductors 20 and hence the thickness of the sample. It is a property of the phase detector that its output is substantially independent of the magnitude of the reference voltage E so long as this voltage is large compared to the signal voltage $e$. Hence, the only requirements for source 11 and cell 13 are that they produce an output voltage large compared with that of cell 3, that both of the voltages are of the same frequency and their relative phase is fixed. It is desirable that the relative phase angle be made nearly zero.

Where a wattmeter 18 is used as in FIG. 1, it may also include a pair of tuned amplifiers such as 22, 23 of FIG. 4 or any other conventional tuned circuit. This circuit is insensitive to constant sources of radiant energy and to energy sources of frequencies other than that produced by chopper 6. Thus it is substantially insensitive to all extraneous "noise" sources. This is also true of the phase detector of FIG. 4 although this circuit also is relatively insensitive to variations in intensity from the auxiliary source 11 so long as voltage E is kept large compared with voltage $e$.

In setting up this apparatus for use, the energy from source 2 is set at a suitable level by rheostat 9 and rheostat 12 is adjusted until the indicator 18 reads full scale with no specimen in place. The full-scale deflection is read as zero thickness and this completes the zero thickness calibration. Calibration may then be completed by placing a specimen of known thickness between collimator 4 and cell 3 and adjusting the sensitivity of indicator 18 to give the proper reading for that thickness. Where the phase detector of FIG. 4 is used, meter 19 may be of most any type. It is convenient to use a conventional vacuum tube voltmeter as it is customarily equipped with a gain adjustment. Alternatively, amplifiers 22 and 23 may have their gains adjustable to assist in calibration.

What is claimed is:

1. In a means for measuring the thickness of a light energy transmissive material, the combination comprising a source of light energy, a collimator for confining the light to a path having a cross section area corresponding to that of the material to be measured whereby the collimated light may be passed through said material, and a means for measuring said collimated light including a light energy detector, the relative response-wavelength characteristic of which includes a portion having a slope of only one sign which is opposite to that of a portion of the relative transmission-wavelength characteristic of the material to be measured, the maximum and zero response regions of said detector characteristic portion substantially coinciding with the zero and maximum transmission regions, respectively, of that of the aforesaid material to be measured.

2. In combination with a means for measuring the thickness of a light energy transmissive material of the type whereby light energy is transmitted through the material to be measured and the transmitted light is measured to indicate the thickness of said material, a light energy detector for receiving said transmitted light, said detector having a relative response-wavelength characteristic including a portion having a slope of only one sign which is opposite to that of a portion of the relative transmission-wavelength characteristic of the material to be measured, the maximum and zero response regions of said detector characteristic portion substantially coinciding with the zero and maximum transmission regions, respectively, of that of the aforesaid material to be measured.

3. Means for measuring the thickness of a light energy transmissive material comprising two light energy sources, a separate light energy detector for each source so positioned as to receive light therefrom and to generate an electric output substantially proportional to the received light, at least one of said detectors having a relative response-wavelength characteristic including a portion having a slope of only one sign which is opposite to that of a portion of the relative transmission-wavelength characteristic of the material to be measured, the maximum and zero response regions of said detector characteristic portion substantially coinciding with the zero and maximum transmission regions, respectively, of that of the aforesaid material to be measured, means for collimating the light in the path between said last mentioned detector and its source whereby said collimated light may be confined to a predetermined area of said material to be measured, and means connected to the outputs from said two detectors to provide an indication of the thickness of said material.

4. Means for measuring the thickness of a light energy transmissive material comprising a source of light energy, means for directing a beam of said energy against a surface of said material, a light energy detector positioned to receive the energy transmitted through said material to produce an electromotive force substantially proportional to the energy transmitted, said detector having a relative response-wavelength characteristic including a portion having a slope of only one sign which is opposite to that of a portion of the relative transmission-wavelength characteristic of the material to be measured, the maximum and zero response regions of said detector characteristic portion substantially coinciding with the zero and maximum transmission regions, respectively, of that of the aforesaid material to be measured, a second source of light energy, a second detector positioned to receive energy from said second source to produce a reference electromotive force, means for periodically varying the energy from both of said sources whereby the two electromotive forces are varied at the same frequency and in fixed relative phase, and an indicating means connected to said two detectors to produce an indication dependent upon their output electromotive forces.

5. The combination of claim 4 wherein said indicating means comprises a wattmeter.

6. Means for measuring the thickness of an infra-red light energy transmissive material comprising two infra-red light energy sources, a separate infra-red light energy detector for each source so positioned as to receive infra-red light therefrom and to generate and electric output substantially proportional to the received light, at least one of said detectors having a relative response-wavelength characteristic including a portion having a slope of only one sign which is opposite to that of a portion of the relative transmission-wavelength characteristic of the material to be measured, the maximum and zero response regions of said detector characteristic portion substantially coinciding with the zero and maximum transmission regions, respectively, of that of the aforesaid material to be measured, means for collimating the light in the path between said last mentioned detector and its source whereby said collimated light may be confined to a predetermined area of said material to be measured, and means connected to the outputs from said two detectors to provide an indication of the thickness of said material.

References Cited in the file of this patent

UNITED STATES PATENTS

| | | |
|---|---|---|
| 2,051,320 | States | Aug. 18, 1936 |
| 2,467,812 | Clapp | Apr. 19, 1949 |
| 2,488,269 | Clapp | Nov. 15, 1949 |
| 2,823,800 | Bliss | Feb. 18, 1958 |
| 2,941,444 | Frykman | June 21, 1960 |

OTHER REFERENCES

"Photoelectric Inspector Detects Green Rot in Eggs," Norris, Electronics, July 1955, vol. 28, No. 7, pages 140–142.